United States Patent
Hauske et al.

(10) Patent No.: US 10,320,478 B2
(45) Date of Patent: Jun. 11, 2019

(54) OPTICAL CHANNEL SOUNDER

(71) Applicant: Huawei Technologies Co., Ltd., Shenzhen, Guangdong (CN)

(72) Inventors: Fabian Nikolaus Hauske, Munich (DE); Changsong Xie, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 48 days.

(21) Appl. No.: 14/934,964

(22) Filed: Nov. 6, 2015

(65) Prior Publication Data
US 2016/0065304 A1    Mar. 3, 2016

Related U.S. Application Data

(63) Continuation of application No. PCT/EP2013/059402, filed on May 6, 2013.

(51) Int. Cl.
*H04B 10/077* (2013.01)
*H04B 10/61* (2013.01)
(Continued)

(52) U.S. Cl.
CPC ....... *H04B 10/0775* (2013.01); *H04B 10/503* (2013.01); *H04B 10/516* (2013.01); *H04B 10/61* (2013.01)

(58) Field of Classification Search
CPC ... H04B 10/0775; H04B 10/61; H04B 10/611
See application file for complete search history.

(56) References Cited

U.S. PATENT DOCUMENTS 4,959,826 A * 9/1990 Smith .................. H04B 1/69
                                                375/E1.001
6,795,607 B1   9/2004 Archambault et al.
(Continued)

FOREIGN PATENT DOCUMENTS

CN       101764665 A     6/2010
CN       101917233 A    12/2010
(Continued)

OTHER PUBLICATIONS

Definition of "grid"; retrieved from https://www.merriam-webster.com/dictionary/grid [Oct. 17, 2018]. (Year: 2018).*
(Continued)

*Primary Examiner* — Nathan M Cors

(57) ABSTRACT

The present invention relates to an optical channel sounding transmitter apparatus, comprising an optical signal generator for generating an optical carrier signal; an optical modulator for modulating the optical carrier signal with a predetermined training sequence to obtain an modulated optical signal; a first optical transmitter for transmitting the optical carrier signal; and a second optical transmitter for transmitting the modulated optical signal. Further the present invention relates to a coherent optical channel sounding receiver apparatus, comprising a first optical receiver for receiving an optical carrier signal over a first optical channel; a second optical receiver for receiving a modulated optical signal over a second optical channel; an optical down converter for down converting the modulated optical signal using the received optical carrier signal to obtain a down converted signal; and a channel estimator for estimating a channel characteristic of the second optical channel.

15 Claims, 12 Drawing Sheets

(51) Int. Cl.
*H04B 10/50* (2013.01)
*H04B 10/516* (2013.01)

(56) References Cited

U.S. PATENT DOCUMENTS

| | | | | |
|---|---|---|---|---|
| 2002/0141355 | A1* | 10/2002 | Struhsaker | H01Q 1/246 370/280 |
| 2004/0114939 | A1* | 6/2004 | Taylor | H04B 10/61 398/152 |
| 2005/0213675 | A1 | 9/2005 | Wei | |
| 2007/0071454 | A1 | 3/2007 | Liu et al. | |
| 2010/0034542 | A1* | 2/2010 | Armstrong | H04B 10/5053 398/158 |
| 2013/0101290 | A1* | 4/2013 | Anandarajah | H04B 10/58 398/49 |

FOREIGN PATENT DOCUMENTS

| | | |
|---|---|---|
| CN | 102006137 A | 4/2011 |
| CN | 102413388 A | 4/2012 |
| EP | 2 487 811 A1 | 8/2012 |
| WO | 2011/023083 A1 | 3/2011 |
| WO | WO 2012/013250 A1 | 2/2012 |
| WO | 2014180495 A1 | 11/2014 |

OTHER PUBLICATIONS

Definition of "direct"; retrieved from htttps://www.merriam-webster.com/dictionary/direct [Oct. 17, 2018]. (Year: 2018).*

Fabio Pittala, et al., "Combined CD and DGD Monitoring Based on Data-Aided Channel Estimation", 2011, 2 pages.

Fabio Pittala, et al., "Efficient Training-Based Channel Estimation for Coherent Optical Communication Systems", Advanced Photonics Congress, 2012, 2 pages.

Xingwen Yi, et al., "Characterization of Passive Optical Components by DSP-Based Optical Channel Estimation", IEEE Photonics Technology Letters, vol. 24, No, 6, Mar. 15, 2012, p. 443-445.

Fabio Pittala, et al., "Fast and Robust CD and DGD Estimation Based on Data-Aided Channel Estimation", IEEE, 2011, 4 pages.

T. Kawanishi, et al., "Fast optical frequency sweep for ultra-fine real-time spectral domain measurement", Electronics Letters, vol. 42, No. 17, Aug. 17, 2006, 2 pages.

Jean-Luc Archambault, "Dispersion Measurement Techniques", OFC 2002, Wednesday Afternoon, p. 252-253.

Tapio Niemi, et al., "Limitations of Phase-Shift Method in Measuring Dense Group Delay Ripple of Fiber Bragg Gratings", IEEE Photonics Technology Letters, vol. 13, No, 12, Dec. 2001, p. 1334-1336.

David J. Krause, et al., "Measurement of Passive Optical Components Using a Carrier and Single Sideband", Optical Society of America, 2005, 3 pages.

Fabio Pittala, et al., "Training-Aided Frequency-Domain Channel Estimation and Equalization for Single-Carrier Coherent Optical Transmission Systems", Journal of Lightwave Technology, vol. 32, No. 24, Dec. 15, 2014, p. 4849-4863.

Stefan et al.; "Optical Wireless OFDM System on FPGA: Study of LED Nonlinearity Effects"; 2011 IEEE 73rd Vehicular Technology Conference (VTC Spring); Yokohama, Japan; May 15-18, 2011; 6 pages.

Pittala et al.; "Training-based channel estimation for signal equalization and OPM in 16-QAM optical transmission systems"; 2012 38th European Conference and Exhibition on Optical Communications (ECOC); Amsterdam, Netherlands; Sep. 16-20, 2012; 4 pages.

* cited by examiner

OPTICAL CHANNEL SOUNDER

This application is a continuation of International Application No. PCT/EP2013/059402, filed May 6, 2013, which is hereby incorporated by reference in its entirety.

TECHNICAL FIELD

The invention relates to the field of channel sounding.

BACKGROUND

In order to determine a characteristic of an optical communication channel, channel measurements must be performed. The characteristic of the optical communication channel is not only influenced by the characteristic of the light propagation path but also by the characteristics of optical components.

Characterization of linear (passive) optical components is often performed by conventional measurements of the passive optical components using an optical spectrum analyzer or a laser scanning system with a focus on magnitude or intensity response. Phase responses are typically measured by modulation phase shift methods, and the interferometric methods. Combining the magnitude and phase response, a transfer function can fully characterize a passive optical component.

Further, components with very fine structures in the wavelength domain are sensitive to mechanical vibrations or thermal fluctuations. Therefore resolution and measurement speed are important specifications to design or choose a characterization method. The methods based on the frequency sweeper using single sideband modulation have demonstrated high-resolution and fast measurement speed. However, high-resolution frequency sweeping over a GHz bandwidth is a slow process, which is not suitable for fast measurements above a kHz range. In addition time varying channel impairments like state-of-polarization rotation (SOP rotation), which may result from mechanical vibrations in the 100 kHz range, cannot be measured over a wide bandwidth with classical sweeping methods, since the sweeping time is too slow. Further, it cannot be obtained if polarization-changes behave differently for different spectral components, which is relevant for the equalization strategy.

For adaptive equalization in digital coherent receivers, "blind" non-training-aided (NTA) and training-aided (TA) methods can be performed to update and to converge the filtering function. TA channel estimation adds a training sequence (TS) to the customer payload data, which is repeated at a regular rate fast enough to track time-varying channel distortions. In a data transmission link, adding training information to the signal degrades the spectral efficiency. The training overhead should be kept considerably low, e.g. below 3% of total signal capacity. With the aid of the spectra of the received TS and the known transmitted spectra of the transmitted TS, full and instantaneous channel estimation can be performed.

The channel estimation can be employed to calculate different filter solutions for adaptive equalization, or cab be used to initialize static device imperfection compensation or to calibrate components and devices during production. It represents amplitude, phase and polarization information of the estimated channel. Only linear channel transfer functions can be estimated.

The channel can consist of optical fiber, filters or any optical components (and electrical components). Also active optical components like amplifiers could be partly characterized and can be tolerated within the channel estimation of a multi-span link. In particular passive optical components like fiber Bragg gratings, interferometers or 90-deg hybrids work on wide-bandwidths. Their frequency-dependent group delay, ripple and attenuation need to be measured in order to define their quality.

For network planning and optimization the link budget including OSNR margin, quality of fiber, amplifiers and other network elements is required to be estimated. This is important in bidding for customer contracts. Currently those parameters are estimated from a few known fiber parameters, e.g. link length and fiber type, with a large safety margin on top. This margin could be substantially lowered with more successful bidding if the link parameters, e.g. quality of link, would be known more accurately.

Classical training aided channel estimation as used in data transmission with adaptive equalization is system optimized for maximum spectral efficiency and low overhead due to the added training sequence. Consequently either a low repetition rate of the training sequence with limited tracking speed of time-varying channel variations or short sequences for only short CIR lengths occur. Thus, low spectral resolution of channel transfer function results. The training sequence constellation is limited to signal constellation points of the payload data modulation (modulator requirement). Guard intervals are used even for cyclic training sequences in order to separate the training sequence and payload data. Training sequence synchronization is used and faulty synchronization limits the maximum tolerable CIR for the channel estimation. Carrier frequency synchronization between signal carrier and local oscillator is used to perform a reliable estimation. This can be achieved digitally with considerable effort.

However, in classical training aided channel estimation, each estimation provides an instantaneous maximum-likelihood (ML) channel characterization within the bandwidth of the digital coherent receiver. This bandwidth is defined by the analog electrical circuitry before analog/digital conversion (ADC) and by the sampling rate of the ADC.

The length of the training sequence defines the resolution of the estimated channel transfer function with longer training sequences having higher resolution. The estimation error is defined by the signal-to-noise ratio (SNR) of the channel. In slowly time-varying or static channel scenarios, averaging can further suppress the influence of noise in the channel.

Sinusoidal tone sweeping can cover a wide spectral range and provides the channel estimation of a single frequency component. A wide range of further methods is often not able to fully characterize the channel with respect to amplitude, phase and polarization or to provide accurate channel estimation.

SUMMARY

It is an object to provide an optical channel sounder enabling a fast measurement with a high resolution.

This object is achieved by the features of the independent claims. Further implementation forms are apparent from the dependent claims, the description and the figures.

According to a first aspect, the invention relates to an optical channel sounding transmitter apparatus comprising an optical signal generator for generating an optical carrier signal; an optical modulator for modulating the optical carrier signal with a predetermined training sequence to obtain an modulated optical signal; a first optical transmitter for transmitting the optical carrier signal; and a second optical transmitter for transmitting the modulated optical signal.

In a first possible implementation form of the optical channel sounding transmitter according to the first aspect as such, the optical signal generator is configured to generate the optical carrier signal at different carrier frequencies at different time instants according to a predetermined time-frequency grid.

In second possible implementation form of the optical channel sounding transmitter according to the first aspect as such or according to the first implementation form of the first aspect, the optical signal generator is configured to generate the optical carrier signal at different carrier frequencies within a predetermined frequency band.

In a third possible implementation form of the optical channel sounding transmitter according to the first aspect as such or according to the first implementation form of the first aspect, the optical signal generator is a tunable laser.

In a fourth possible implementation form of the optical channel sounding transmitter according to the first aspect as such or according to any of the preceding implementation forms of the first aspect, the optical transmitter comprises a driver for controlling the optical signal generator to adjust different carrier frequencies of the optical carrier signal.

In a fifth possible implementation form of the optical channel sounding transmitter according to the first aspect as such or according to any of the preceding implementation forms of the first aspect, the optical modulator is configured to modulate the optical carrier signal at different time instants with the same training sequence.

In a sixth possible implementation form of the optical channel sounding transmitter according to the first aspect as such or according to any of the preceding implementation forms of the first aspect, the optical transmitter comprises a training sequence provider for providing the predetermined training sequence.

In a seventh possible implementation form of the optical channel sounding transmitter according to the first aspect as such or according to any of the preceding implementation forms of the first aspect, the first optical transmitter or the second optical transmitter respectively comprises a transmitter diode.

According to a second aspect, the invention relates to a coherent optical channel sounding receiver apparatus comprising a first optical receiver for receiving an optical carrier signal over a first optical channel; a second optical receiver for receiving a modulated optical signal over a second optical channel, the modulated optical signal comprising a received copy of the optical carrier signal modulated with a predetermined training sequence, the received copy of the optical carrier signal being affected by the optical channel; an optical down converter for down converting the modulated optical signal using the received optical carrier signal to obtain a down converted signal; and a channel estimator for estimating a channel characteristic of the second optical channel upon the basis of the down converted signal and the predetermined training sequence.

In a first possible implementation form of the coherent optical channel sounding receiver apparatus according to the second aspect as such, the first optical channel and the second optical channel are different optical channels, and wherein the first optical channel has a predetermined channel characteristic.

In a second possible implementation form of the coherent optical channel sounding receiver apparatus according to the second aspect as such or according to the first implementation form of the second aspect, the channel characteristic is a channel transfer function of a channel impulse response.

In a third possible implementation form of the coherent optical channel sounding receiver apparatus according to the second aspect as such, according to the first implementation form of the second aspect, or according to the second implementation form of the second aspect, the coherent optical channel sounding receiver apparatus comprises an analogue-to-digital converter arranged between the optical down converter and the channel estimator.

According to a third aspect, the invention relates to an optical channel sounder, comprising the optical channel sounding transmitter apparatus according to the first aspect as such or according to any of the preceding implementation forms of the first aspect and the coherent optical channel sounding receiver apparatus according to the second aspect as such or according to the first implementation form of the second aspect, according to the second implementation form of the second aspect or according to the third implementation form of the second aspect.

In a first possible implementation form of the optical channel sounder according to the third aspect as such, the optical channel sounder comprises an optical connector for connecting the first optical transmitter and the first optical receiver.

These and other aspects of the invention will be apparent from the embodiment(s) described below.

DETAILED DESCRIPTION

In the following, reference is made to methods, which are schematically and exemplarily illustrated in flow charts and block diagrams. It should be understood that the methods described in conjunction with those illustrative drawings may easily be performed by embodiments of systems, apparatuses and/or devices as well. In particular, it should be obvious that the systems, apparatuses and/or devices capable of performing the detailed block diagrams and/or flow charts are not necessarily limited to the systems, apparatuses and/or devices shown and detailed herein below, but may rather be different systems, apparatuses and/or devices. The terms "first", "second", "third", etc. are used merely as labels, and are not intended to impose numerical requirements on their objects or to establish a certain ranking of importance of their objects.

Figure 1:
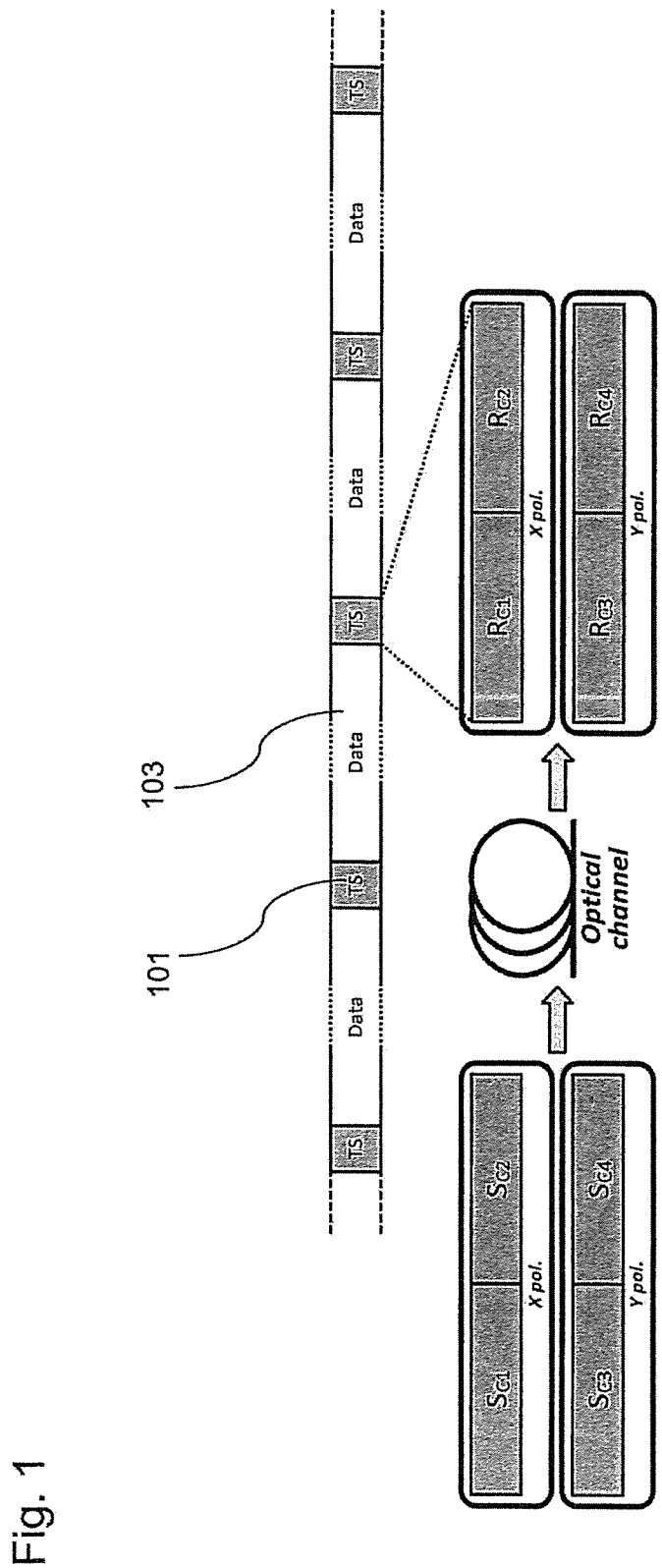
FIG. 1 shows a typical structure of a signal including a regular TS block in between the payload data for TA channel estimation.

FIG. 1 shows a typical structure of a signal including a regular training sequence block (TS block) 101 in between the payload data 103 for training-aided (TA) channel estimation.

An optical "single-mode" transmission signal can be described with respect to amplitude and phase, represented as a real- and imaginary-part of a complex number respectively, and two polarizations. A single-mode fiber supports two polarization modes. Correspondingly any linear (passive) optical device, such as a fiber, a filter, a multiplexer (MUX) or a coherent front-end, can be described by its impulse response h(t) or its transfer function H(f).

The knowledge of channel transfer functions is vital for the design of optical communication links including components in the transmitter and receiver terminal equipment. It can be required during a calibration stage, during fabrication or mounting, during installation or for continuous monitoring of time-varying channel impairments.

For training-aided (TA) channel estimation in electrical and optical communication a regular training sequence 101 is transmitted between payload data blocks 103 in order to estimate the channel transfer function with respect to amplitude, phase and polarization and to update the filtering function for equalization in time varying channel conditions.

With the aid of the received spectra R(C1, C2, C3, C4) and the known transmitted spectra of the training sequence S(C1, C2, C3, C4), the receiver estimates the channel by formula (1).

$$\hat{H}(f) = \begin{pmatrix} \hat{H}_{xx}(f) & \hat{H}_{yx}(f) \\ \hat{H}_{xy}(f) & \hat{H}_{yy}(f) \end{pmatrix} = \begin{pmatrix} \dfrac{R_{C1}S_{C4} - R_{C2}S_{C3}}{S_{C1}S_{C4} - S_{C2}S_{C3}} & \dfrac{R_{C2}S_{C1} - R_{C1}S_{C2}}{S_{C1}S_{C4} - S_{C2}S_{C3}} \\ \dfrac{R_{C3}S_{C4} - R_{C4}S_{C3}}{S_{C1}S_{C4} - S_{C2}S_{C3}} & \dfrac{R_{C4}S_{C1} - R_{C3}S_{C2}}{S_{C1}S_{C4} - S_{C2}S_{C3}} \end{pmatrix} \quad (1)$$

For the estimation of four unknown variables of the 2×2 channel matrix, four independent equations are required. Using orthogonal sequences S(C1) and S(C3) as well as S(C2) and S(C4) satisfies this requirement and is denoted as Amalouti Scheme. The length of each sequence S(C1, C2, C3, C4) should cover at least the channel impulse response (CIR) length.

Nevertheless alternative structures require only one single sequence per polarization with an associated processing for the channel estimation. The length of each block covers at least two times the channel impulse response (CIR). This scheme requires only a single training slot. By windowing of the estimated impulse response the 4 components of the 2×2 channel matrix are obtained.

Figure 2:
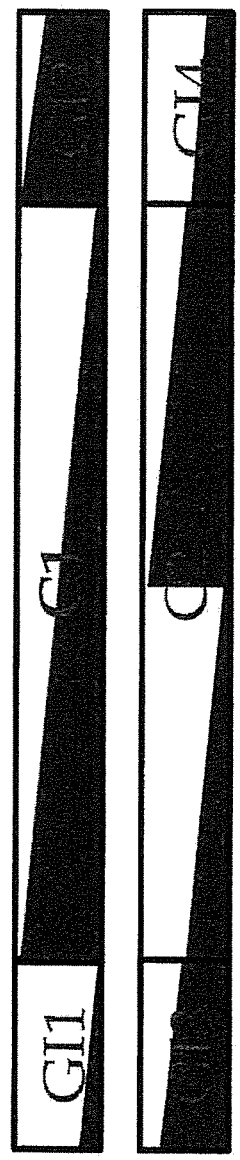
FIG. 2 shows a possible training structure with orthogonal cyclic signal patterns including extension by guard intervals.

FIG. 2 shows a possible training structure with orthogonal cyclic signal patterns C1 and C2 (shifted version of C1) including extension by guard intervals. From channel estimation, the frequency domain (FD) filter taps can be calculated by a zero forcing (ZF) solution via formula (2):

$$W_{ZF}(f) = \hat{H}^{-1} \quad (2)$$

and a minimum mean square error (MMSE) solution via formula (3).

$$W_{MMSE}(f) = \hat{H}^H \left( \hat{H}\hat{H}^H + \dfrac{\sigma_n^2}{\sigma_s^2} \right)^{-1} \quad (3)$$

where $(\cdot)^{-1}$ and $(\cdot)^H$ denote the complex-conjugate (Hermitian) transpose and the inverse, respectively. $\sigma_n^2$ and $\sigma_s^2$ are the noise and signal powers which should be estimated at the receiver.

The ZF solution is the pure inverse of the channel characteristics, which might lead to noise enhancement in case of amplitude distortions. The MMSE solution is the optimum trade-off between noise suppression and ISI cancellation. In order to extract the training sequence, a prior framing synchronization can be performed. In addition averaging over consecutive channel estimation or training sequences TSs may be applied to suppress the influence of noise in static channel conditions.

Due to dispersion in the channel inter-symbol-interference (ISI) random data symbols can leak into the training symbols. Thus, a guard interval is used around the training sequence. For data transmission the overhead for channel estimation is kept as low as possible. Blind data recovery methods complement the TA channel estimation.

Channel sounder providing wide-range channel characterization using a CAZAC sequence and digital signal processing DSP is described. The properties of the training sequence influence the channel estimation, as seen in a comparison between the single stage or Alamouti scheme. The training sequence utilizes signal constellation points that may be generated by the modulators. Further, constant signal amplitude allows driving the modulators and transmitter amplifiers in the optimum range and avoids power fluctuations and optical (fiber) nonlinearities during transmission. For synchronization of the training sequence, i.e. detecting the training sequence within random data, a zero auto-correlation and orthogonality may be within the CIR length with respect to the other polarization signal.

So called constant-amplitude zero auto-correlation (CAZAC) signals fulfill these conditions and may be used for channel estimation. Sub-optimum training sequences design leads to inferior channel estimation.

An exemplary CAZAC training sequence generator has the following characteristics:

Discrete time samples n=0, 1, . . . , N−1;
c(n)=exp{j2pi/sqrt(n) (mod(n,sqrt(N))+1) (floor(n/sqrt(N)+1)};
If sqrt(N) is an integer: Signal constellation points of the training sequence refer to complex coefficients of a phase-shift keying (PSK) modulation;
Cyclic sequence with constant amplitude and a single non-zero auto-correlation; and
the auto-correlation properties lead to a white spectrum such that each spectral component in the channel is affected by the training sequence signal in the same way. This leads to optimum channel estimation within the signal bandwidth.

Figure 3:
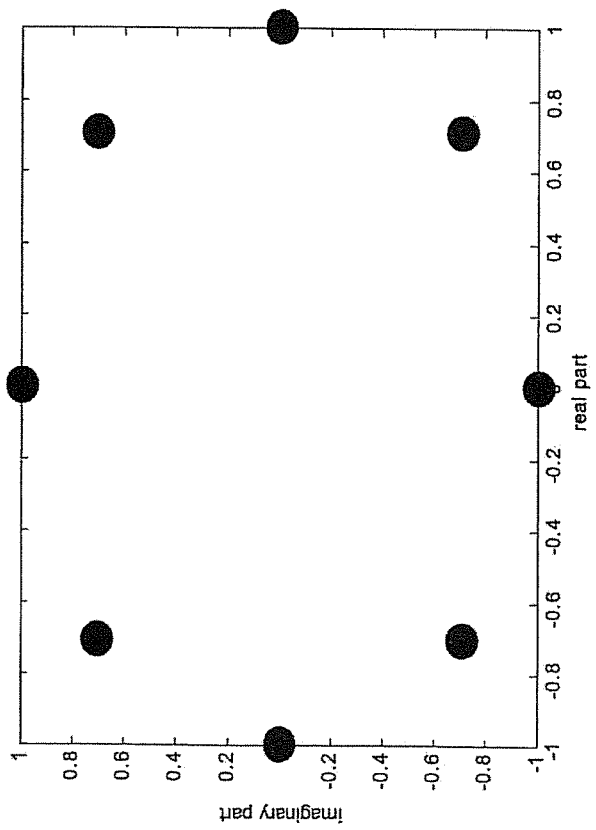
FIG. 3 shows a constellation plot of constant-amplitude zero auto-correlation (CAZAC) sequence of length 64 forming an 8-PSK signal constellation.

FIG. 3 shows a constellation plot of a constant-amplitude zero auto-correlation (CAZAC) sequence of length 64 forming an 8-PSK signal constellation.

Figure 4:
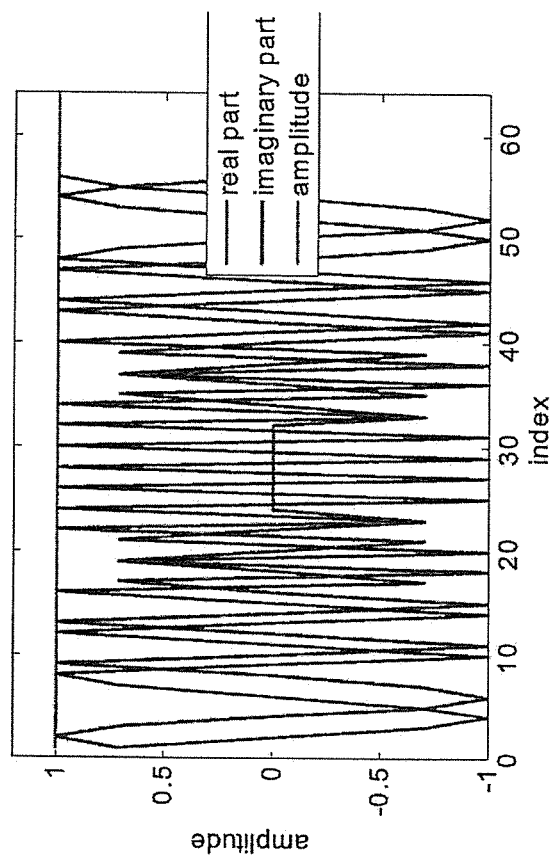
FIG. 4 shows an exemplary CAZAC sequence of length 64 with respect to the complex components of imaginary and real part.

FIG. 4 shows an exemplary CAZAC sequence of length 64 with respect to the complex components of imaginary and real part.

In training sequence channel estimation for device characterization a multi-carrier signal can be used for channel estimation related to orthogonal frequency-division multiplexing (OFDM) transmission with cyclic prefix and framing synchronization. An optimum training sequence can be applied (random OFDM symbols) with polarization-diversity. A tuning laser can be employed such that the measurement is not limited to the electrical receive bandwidth.

Figure 5:
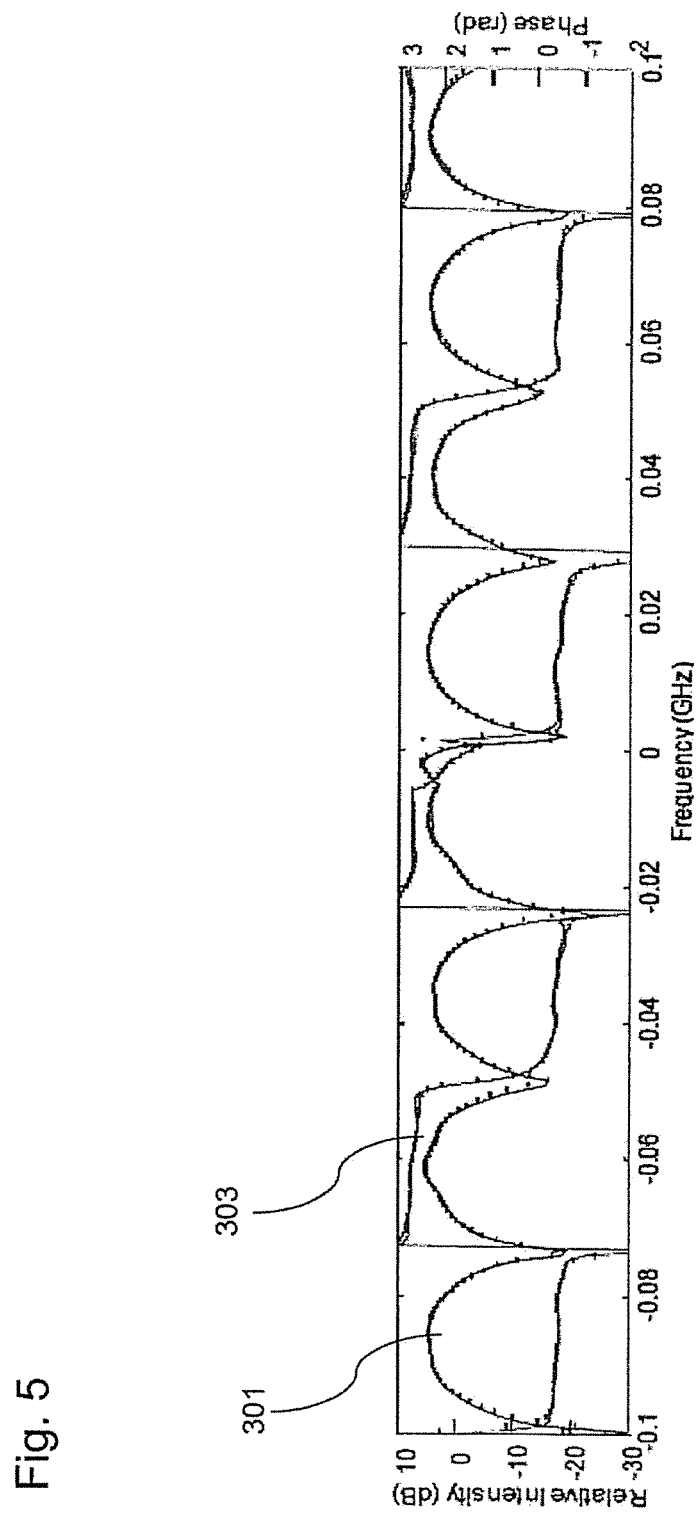
FIG. 5 shows an example of partial channel estimation characterizing an optical component with respect to amplitude and phase.

FIG. 5 shows an example of partial channel estimation characterizing an optical component with respect to amplitude 301 and phase 303.

The optical network analyzer or optical channel sounder allows a wide-range channel characterization and performance prediction using a tunable laser source, training signal transmission and digital signal processing. A single laser source can be used as a carrier for signal modulation and as local oscillator LO in polarization-diverse 90-degree hybrid of the receiver RX. The laser source can be tunable to scan through any desired point in the spectrum. Further, the optical channel sounder can transmit a cyclic training sequence which is optimized for channel estimation, e.g. CAZAC for 2×2 MIMO channel. After polarization-diverse optical 90 deg-hybrid and analog-digital-converter ADC continuously perform the channel estimation within the bandwidth of the electrical receiver and synthesize all estimations during a carrier signal sweep to provide a wide-range channel estimation. By tuning the laser each channel estimation is shifted in frequency. The superposition of consecutive channel estimations allows reconstructing the wide-bandwidth channel. Furthermore, averaging can improve the estimation.

Figure 6:
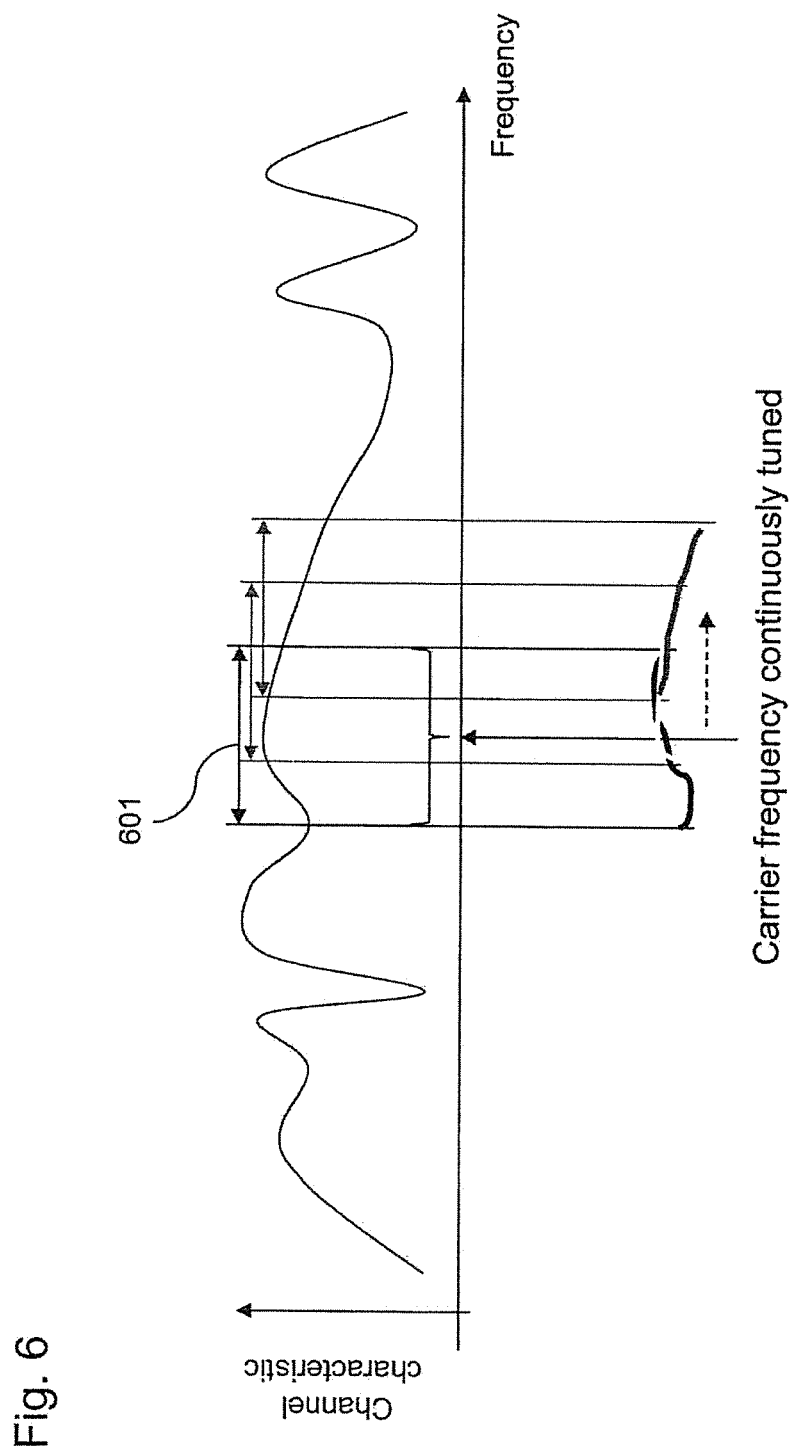
FIG. 6 shows a scheme of consecutive channel estimation for different carrier frequencies and synthesis of the wide-range channel characterization on basis of the overlapping channel estimations.

FIG. 6 shows a scheme of consecutive channel estimation for different carrier frequencies and synthesis of the wide-range channel characterization on basis of the overlapping channel estimations. A frequency range 601 is limited by the receiver. A Superposition of consecutive channel estimations allows averaging.

Figure 7:
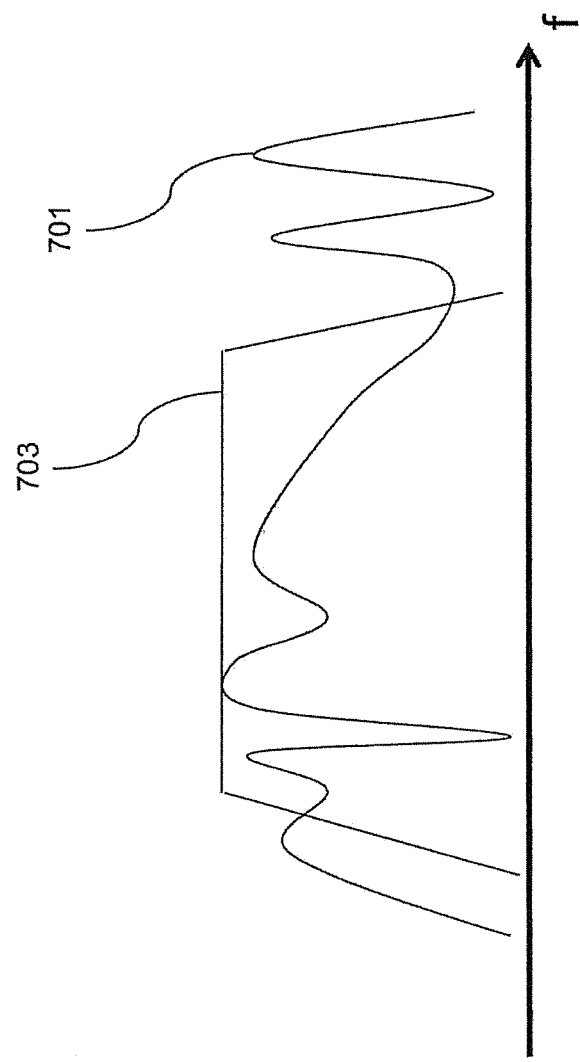
FIG. 7 shows a high-speed measurement within a receiver bandwidth.

FIG. 7 shows a high-speed measurement 701 within a receiver bandwidth 703. Within the receiver bandwidth 703 a high-speed channel characterization is limited by the repetition rate of the training sequence and the length of the training sequence. Within the receiver bandwidth 703 the time-bandwidth product of the estimation can be achieved, meaning that a longer training sequence will result in a better spectral resolution at the cost of a lower repetition rate, i.e. lower time resolution. In contrast a shorter training sequence TS with high repetition rate allows faster tracking of time variations but at the cost of a lower resolution. Depending on the channel requirements, the time resolution and the frequency resolution can be optimized accordingly.

Figure 8:
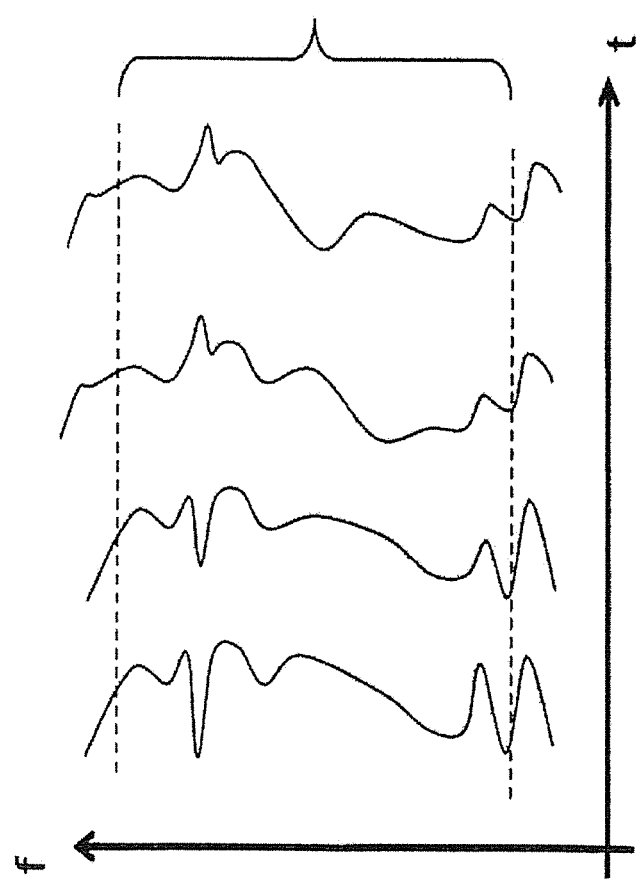
FIG. 8 shows an illustration of time-bandwidth product with time resolution given by training repetition rate and frequency resolution given by the training sequence length.

FIG. 8 shows an illustration of a time-bandwidth product with time resolution given by training repetition rate and frequency resolution given by the training sequence length. The channel estimation can be used to characterize passive optical components over a wide bandwidth, i.e. bandwidth of the electrical receiver+tuning of local oscillator and transmitter laser.

A using of CAZAC sequences, e.g. single-carrier modulation, employs a constant modulus modulation, e.g. phase-shift keying with unity amplitude, which avoids large peak-to-average power ratio PAPR and clipping like for orthogonal frequency division multiplex OFDM signals.

A employing pseudo noise PN sequences with OFDM modulation also generates a white spectrum. The measurement speed is increased, since each training sequence with a duration in the nano-second range delivers a complete estimation. Further, resolution is improved, which is defined by the length of the training sequence in relation to the digital sampling. For transmission channel characterization and performance estimation, the optical sounder can be realized as an independent measurement instrument, which is independent from any vendor/carrier's existing network infrastructure and comfortable to use, e.g. in plug and play fashion.

Channel estimation can be performed at highest possible rate, since no data between the training sequence TS are applied. Further no guard interval GI is used when cyclic training sequence TS and single-stage TS scheme are applied. Further, no cyclic prefix as required for OFDM transmission is used.

An accurate training sequence synchronization is not required, if a cyclic single-stage training sequence scheme is applied, i.e. no limitation to carrier-to-interference ratio CIR length tolerance, since any position within a complete training sequence length performs a valid channel estimation. Different positions of received TS and TS applied for channel estimation merely result in a time-delay which not vital for most channel characterizations and can be removed by timing estimation.

Figure 9:
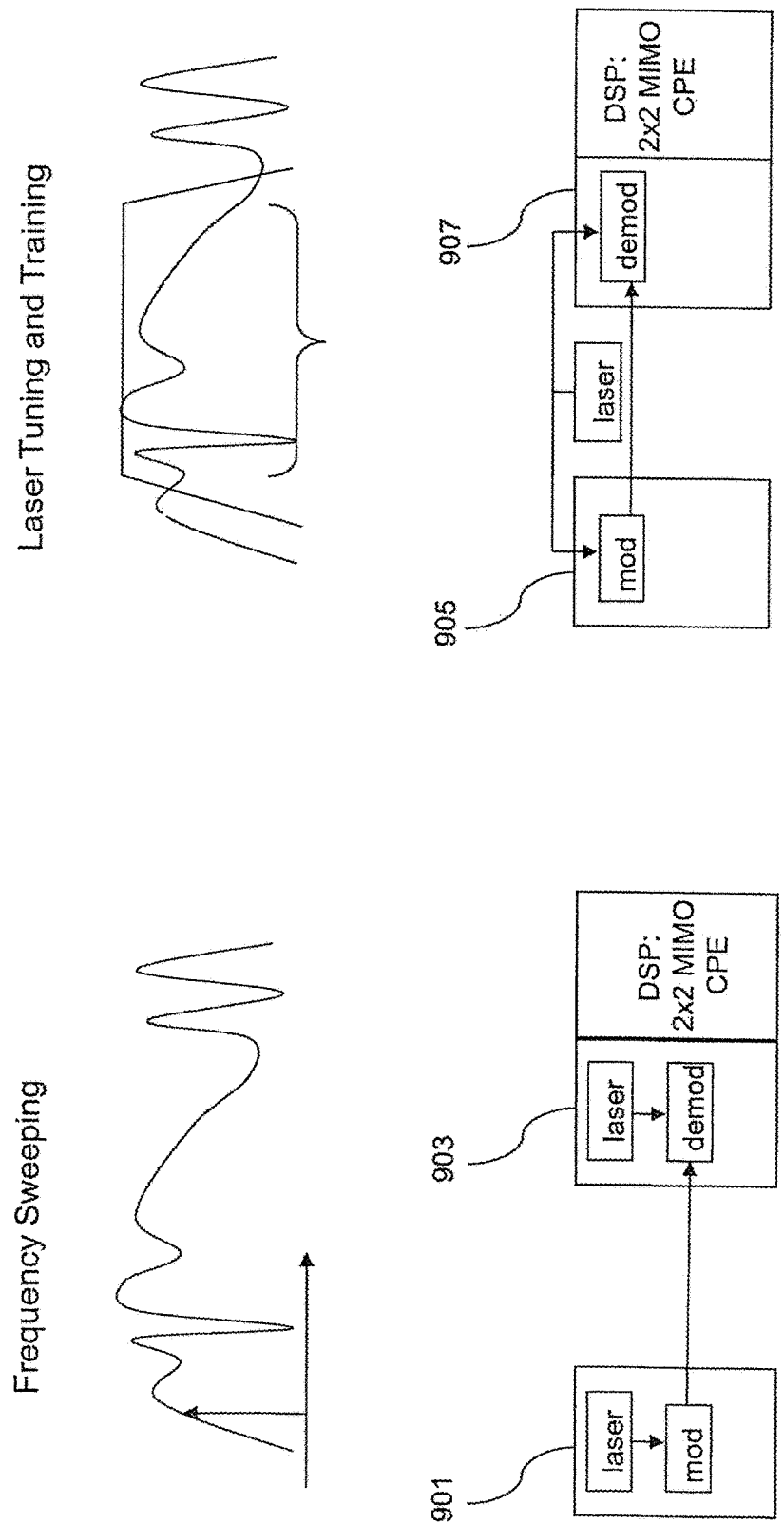
FIG. 9 shows classical frequency sweeping and frequency sweeping according to an embodiment of the invention.

FIG. 9 shows classical frequency sweeping in comparison with frequency sweeping according to the invention.

In classical frequency sweeping the process of sweeping takes a long time even within the GHz bandwidth. A setup typically comprises a transmitter 901 and a receiver 903. The transmitter 901 comprises a laser and a modulator. The receiver 903 comprises a laser and a demodulator.

Intradyne detection with offset of transmitter and receiver laser requires digital carrier recovery in the receiver and causes problems with laser line width and carrier drift. Noise tolerance advertisement NTA channel estimation, e.g. by constant modulus algorithm CMA/least-mean-squares LMS, is relatively slow for high speed tracking. Training-aided channel estimation is interrupted with payload data and a slow measurement results. The carrier is static, i.e. no frequency sweep.

In laser tuning and training an instantaneous high speed measurement within the receiver bandwidth is instantaneously possible. The measurement speed is defined by time/bandwidth product of training sequence length and resolution. Sweeping allows wide-range measurement exceeding the electrical RX bandwidth (if required). A homodyne arrangement with identical drift and line width in TX and RX without impact of laser impairments is used.

In comparison with classical state-of-the-art techniques the following advantages can be achieved.

A possible implementation uses a single laser source for the signal carrier and for the LO in the digital coherent receiver. This provides an ideal homodyne coherent detection. The driver of the tunable laser can control the carrier frequency. Knowing the driver signal at the RX allows an easy synthesis of the estimated channels during a sweep. A known carrier frequency equals a known center frequency of estimated channel transfer function. If the sweeping time is slow compared to the TS time, typically the case at speeds of 28 GBaud, consecutive channel estimations largely overlap such that a synthesis is also possible without knowledge of the driver signal. Synthesis could be employed blindly by using correlation of adjacent channel estimations.

Tunable lasers are available for sweeps in the complete L- or C-band. Due to the homodyne arrangement, the linewidth of the laser plays a minor role given sufficiently high symbol rates. The TS generator provides the patterns for the TS according to the requirements for time- and frequency resolution and according to the limitations imposed by the modulator stage. The modulator stage modulates the signal with respect to amplitude, phase and polarization in order to send a polarization-division multiplexed PDM phase shift keying PSK signal. The TS is known at the RX and a cyclic training sequence TS with CAZAC properties is used for optimum channel estimation.

Figure 10:
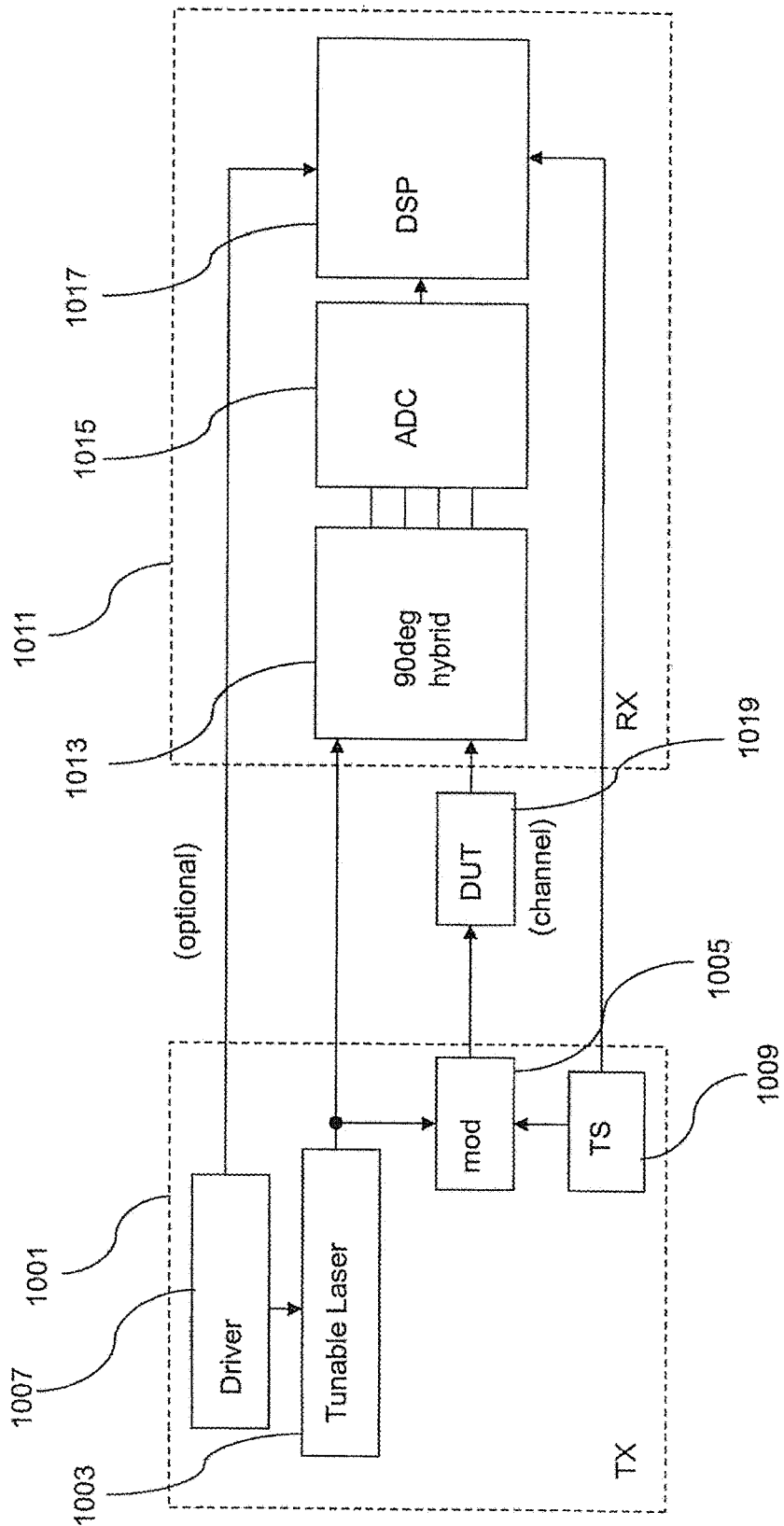
FIG. 10 shows an implementation with single carrier source for ideal homodyne coherent detection.

FIG. 10 shows a possible implementation with a single carrier source for ideal homodyne coherent detection. The optical channel sounder 1000 comprises an optical channel sounding transmitter (TX) apparatus 1001 and a coherent optical channel sounding receiver (RX) apparatus 1011.

The optical channel sounding transmitter apparatus 1001 comprises, a tunable laser as an optical signal generator 1003, a modulator 1005. Optional, the apparatus 1001 may further comprise a driver 1007 and a training sequence, TS, provider 1009.

The coherent optical channel sounding receiver apparatus 1011 comprises a polarization-diverse 90 deg hybrid 1013, an analog-to-digital-conversion ADC stage 1015 (DSO), a digital signal processor DSP 1017 for channel estimation and synthesis.

After homodyne digital coherent detection and analog-to-digital-conversion ADC a digital sampled and quantized representation of the received signal can be employed in the digital signal processing (DSP) stage 1017 for consecutive channel estimation. This arrangement does not show differences in carrier frequency between the local oscillator LO and the received signal. Consequently, a digital or analogue carrier recovery is not required.

Any phase offset or any device imperfection imposed by components in the transmitter TX 1001 and the receiver RX 1011 can be calibrated out by a back-to-back measurement without the device under test (DUT) 1019. This calibration also allows extending the estimation closer to the stop-band of the electrical bandwidth limitation as the attenuation and phase distortions in this region can be compensated by the calibration measurement. Alternatively, the side-bands of the estimated channel affected by bandwidth limitations might be omitted in the estimation.

The timing error between the received training sequence and the known training sequence for channel estimation can be easily estimated by digital timing estimation algorithms, like data aided DA timing recover, or easy due to regular pattern of repeated training sequence.

The analog-to-digital converter ADC 1015 can operate in burst-mode with subsequent offline processing, which limits the measurement time to the burst sampling time but relaxes the digital signal processing DSP conditions for high-speed processing.

Alternatively, continuous sampling can be performed in the analog-to-digital converter ADC 1015 with subsequent high-speed processing in the digital signal processing DSP 1017. Sampling rates of 56 GSamples/s are achievable with receive bandwidths of more than 20 GHz (single-sided).

The length of the training sequence defines the length $N_{FFT}$ of the fast Fourier transformation FFT in the digital-signal processor DSP 1017 for the estimation of the channel transfer function. Given a constant sampling rate of $R_s$ in the analog-to-digital converter ADC 1015, a spectral resolution of $D_f = R_s/N_{FFT}$ is achieved. At the same time, $D_f$ refers to the maximum possible repetition rate of the training sequence and gives a time resolution $D_t = 1/D_f$. At a sampling rate of 56 GSamples/s (over-sampling with 2 samples per symbol) and a training sequence length of 64 symbols ($N_{FFT} = 128$ samples) a spectral resolution of $D_f = 437.5$ MHz is obtained at a time resolution of about 2.286 ns.

This method can be applied for wide-range channel estimations characterizing all linear impairments with respect to amplitude, phase and polarization. It is suitable for precise, accurate and reliable characterization of Fiber Bragg gratings FBGs; optical filters like MUX, DEMUX, WSS, OADM, Waveshaper; all kinds of interferometers like delay interferometers for differential detection, polarization-diverse 90 deg hybrids; fiber characterization, e.g. differential group delay DGD or polarization-dependent loss PDL spectrum over wide bandwidth, which can be important for wide-bandwidth channels or Terabit transmission; and tracking fast time-varying channel changes within electrical receive bandwidth (no frequency sweeping of laser), e.g. to allow to monitor vibration sensitivity. In addition the method can be applied for factory calibration of transponders.

Figure 11:
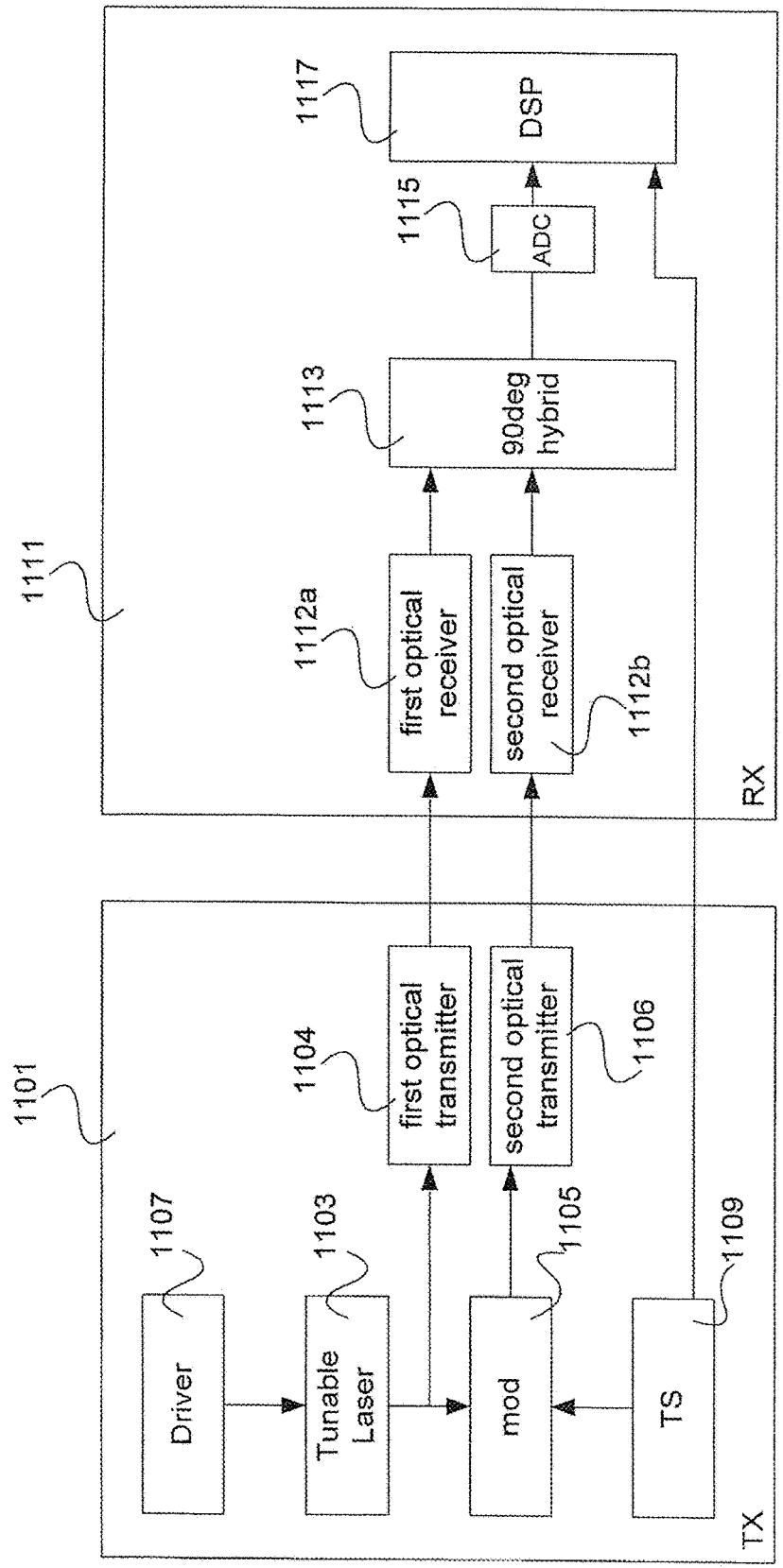
FIG. 11 shows a further implementation with single carrier source for ideal homodyne coherent detection.

FIG. 11 shows a possible further implementation with a single carrier source for ideal homodyne coherent detection. The optical channel sounder 1100 comprises an optical channel sounding transmitter (TX) apparatus 1101 and a coherent optical channel sounding receiver (RX) apparatus 1111.

The optical channel sounding transmitter apparatus 1101 comprises, a tunable laser as an optical signal generator 1103, a modulator 1105. Optional, the apparatus 1101 may further comprise a driver 1107 and a training sequence, TS, provider 1109.

The coherent optical channel sounding receiver apparatus 1111 comprises a first optical receiver 1112a, a second optical receiver 1112b, a polarization-diverse 90 deg hybrid 1113, an analog-to-digital-conversion ADC stage 1115 (DSO), and a digital signal processor DSP 1117 for channel estimation and synthesis.

The tunable laser 1103 provides an optical carrier signal to the modulator 1105 and the first optical transmitter 1104. The modulator 1105 provides a modulated optical signal to the second optical transmitter 1106. The training sequence provider 1109 is connected to the DSP 1117.

The first optical transmitter 1104 is connected via a first optical channel to the first optical receiver 1112a. The second optical transmitter 1106 is connected via a second optical channel to the second optical receiver 1112b. The first optical receiver 1112a provides the optical carrier signal to the 90 deg hybrid 1113 and the second optical receiver 1112b provides the modulated optical signal to the 90 deg hybrid 1113. The 90 deg hybrid 1113 provides a down converted signal to the ADC stage 1115. The ADC stage 1115 is connected to the DSP 1117.

Figure 12:
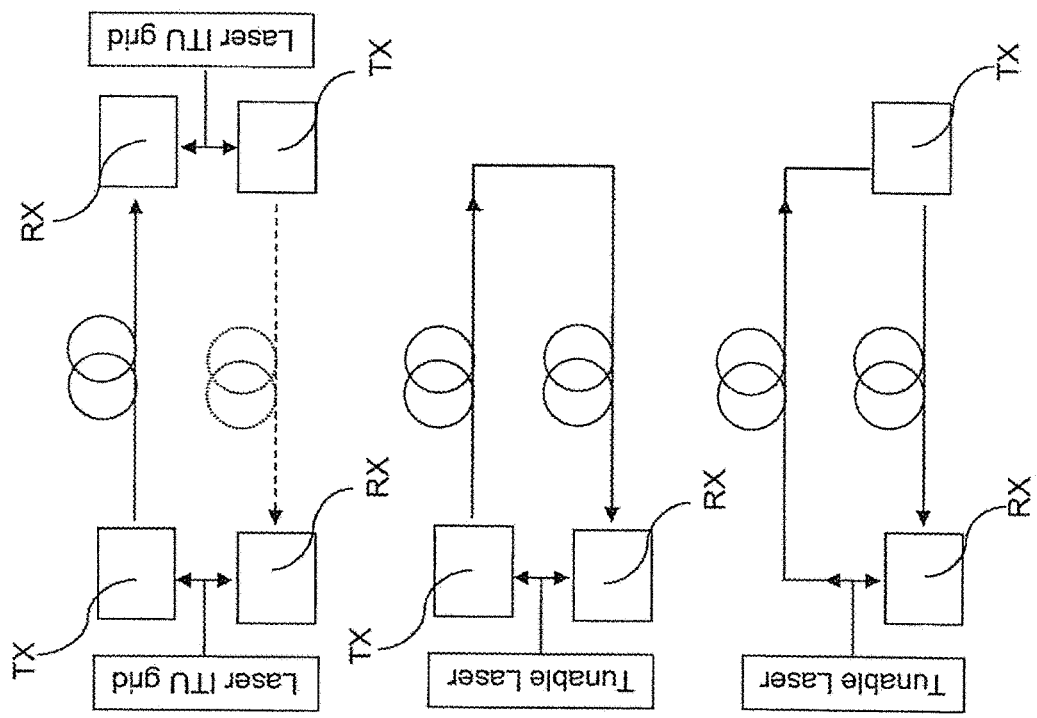
FIG. 12 shows alternative structures for large devices under test or remote transceivers and receivers.

FIG. 12 shows alternative structures for large devices under test (DUTs) or remote transceivers TX and receivers RX. A large size "DUTs" is e.g. a fiber transmission channel with several links spanning over more several thousand kilometers. In this case the following alternative implementations could be considered:

B1): Tuning the transmitter TX/RX laser to ITU grid and transmitting a modulated training sequence (CAZAC). Unidirectional is allowed, e.g. with separate TX/RX or joint 2×TX/RX bidirectional, e.g. getting forward and backward channel at the same time. This can requires sophisticated carrier recovery in the receiver digital signal processor RX DSP due to laser line width and local oscillator frequency offset LOFO.

B2): Looping back training sequence with identical TX/RX laser and tuning to any carrier frequency. Propagation delay can be calibrated out. Channel with double length is used, inward and outward transmission use the same fiber.

B3): Looping back only laser and tuning to any carrier frequency. Laser propagation delay can be calibrated out and a carrier recovery DSP is not required. Alternatively in the TX the received master laser can drive a slave laser locked by frequency and phase using a phase locked loop PLL.

Other combinations of cooperating TX/RX and laser elements can be used.

Another application is a performance predictor. In most cases it is not possible to predict performance and to give an overall margin. If the margin is too large, sometimes the planned network does not work even with this "large" margin because of fast SOP or large DGD. Thus, it is advantageous to have more information of the link ahead of planning.

The channel estimation based on the CAZAC sequence represents all properties of the link with respect to amplitude, phase and polarization. The longer the CAZAC sequence is, the higher is the resolution of one capture of the channel transfer function. All secondary parameters like chromatic dispersion CD, slope, polarization mode dispersion PMD, polarization-dependent loss PDL, state of polarization SOP, and optical signal-to-noise ratio OSNR can be derived from the estimated channel transfer function.

With the estimated OSNR, the pre-forward error correction FEC bit-error rate BER performance for any modulation format can be anticipated including the margin for each modulation format. For special training sequences, certain modulation formats can be emulated, i.e., same constellations of data modulation and training sequence. In this case, the pre-FEC BER can be obtained directly, e.g. CAZAC of length 16 looks like quadrature phase-shift keying QPSK data.

Due to the known training sequence the phase noise can be estimated with high accuracy. Tuning the launch power of the transmitted modulated signal also allows a precise estimation of the nonlinearity threshold. Further, the performance predictor can be employed by carriers to investigate the margins of the existing network and to optimize the network.

Vendors can utilize this tool to investigate the properties of an existing network for planning an upgrade with coherent technology and with higher-order modulation formats. This supports vendors' bidding for a project as the carrier can give only network parameters like fiber types, span lengths, position of amplification nodes, position of reconfigurable optical add-drop multiplexer ROADM nodes.

An arrangement for characterization of optical channels can use a tunable laser source as carrier signal and as local oscillator and employ data-aided channel estimation after polarization-diverse coherent detection and analogue/digital conversion. Further a synthesis of consecutive channel estimations from different carrier wavelengths for wide-bandwidth measurement is possible. Employing data-aided channel estimation is possible but not limited to coherent homodyne detection, i.e. single tunable laser source for TX modulation and LO.

Utilizing a special training sequence is possible but not limited to a cyclic training sequence, not limited to a constant-amplitude and arbitrary phase-modulation in each of the two polarizations and not limited to single-stage shifted by half training length in each polarization.

According to some implementation forms, the invention provides an efficient estimation of an optical channel characterized by a complex-valued multi-input multi-output (MIMO) transmission with coherent detection and digital signal processing.

Abbreviations:
PDM Polarization Division Multiplexing
(D)QPSK (Differential) Quantanary Phase Shift Keying
CD Chromatic Dispersion
PMD Polarization Mode Dispersion
PLL Phase Locked Loop
FD Frequency Domain
TD Time Domain
FFT Fast Fourier Transform
IFFT Inverse Fast Fourier Transform
DFT Discrete Fourier Transform
DSP Digital Signal Processing
ADC Analog/Digital Converter
FIR Finite Impulse Response
LO Local Oscillator
FO Frequency offset
DUT Device under test
PMD Polarization-Mode Dispersion
sps Samples per Symbol
FFW Feed Forward
FB Feed Back
SOP State of Polarization
PDL Polarization-Dependent Loss
DGD Differential Group Delay
FEC Forward Error Correction
BER Bit-Error Rate
CPE Carrier-Phase Estimation
I Inphase
Q Quadrature
DA Data-aided
NDA Non-data-aided
CAZAC Constant-amplitude zero auto-correlation
PN Pseudo noise
DAC Digital-analogue converter
ZF Zero Forcing
MMSE Minimum mean square error
MIMO Multi input multi output
DSO Digital sampling oscilloscope

What is claimed is:

1. An optical channel sounding transmitter apparatus, comprising:
   an optical signal generator for generating an optical carrier signal, wherein the optical signal generator is configured to generate the optical carrier signal at different carrier frequencies at different time instants according to a predetermined time-frequency grid;
   an optical modulator for modulating the optical carrier signal with a predetermined constant-amplitude zero auto-correlation (CAZAC) training sequence to obtain a modulated optical signal;
   a first optical transmitter for transmitting the optical carrier signal to a receiver apparatus; and
   a second optical transmitter for transmitting the modulated optical signal.

2. The optical transmitter according to claim 1, wherein the optical signal generator is configured to generate the optical carrier signal at different carrier frequencies within a predetermined frequency band.

3. The optical transmitter according to claim 1, wherein the optical signal generator is a tunable laser.

4. The optical transmitter according to claim 1, further comprising a driver for controlling the optical signal generator to adjust different carrier frequencies of the optical carrier signal.

5. The optical transmitter according to claim 1, wherein the optical modulator is configured to modulate the optical carrier signal at different time instants with the same training sequence.

6. The optical transmitter according to claim 1, further comprising a training sequence provider for providing the predetermined CAZAC training sequence to the optical modulator and to the receiver apparatus.

7. The optical transmitter according claim 1, wherein the first optical transmitter or the second optical transmitter respectively comprises a transmitter diode.

8. A coherent optical channel sounding receiver apparatus, comprising:
- a first optical receiver for receiving an optical carrier signal over a first optical channel, wherein the optical carrier signal is received at different carrier frequencies at different time instants according to a predetermined time-frequency grid;
- a second optical receiver for receiving a modulated optical signal over a second optical channel, the modulated optical signal comprising a received copy of the optical carrier signal modulated with a predetermined constant-amplitude zero auto-correlation (CAZAC) training sequence, the received copy of the optical carrier signal being affected by the optical channel;
- an optical down converter, separately connected to the first optical receiver and the second optical receiver, for down converting the modulated optical signal using the received optical carrier signal to obtain a down converted signal; and
- a channel estimator for estimating a channel characteristic of the second optical channel upon the basis of the down converted signal and the predetermined CAZAC training sequence, wherein the channel estimator uses a CAZAC sequence flat spectrum property to measure the channel frequency response of the second optical channel.

9. The coherent optical channel sounding receiver apparatus according to claim 8, wherein the first optical channel and the second optical channel are different optical channels, and wherein the first optical channel has a predetermined channel characteristic.

10. The coherent optical channel sounding receiver apparatus according to claim 8, wherein the channel characteristic is a channel transfer function of a channel impulse response.

11. The coherent optical channel sounding receiver apparatus according to claim 8, further comprising an analog-to-digital converter arranged between the optical down converter and the channel estimator.

12. The coherent optical channel sounding receiver apparatus according to claim 8, wherein the channel estimator is a digital signal processor that receives the predetermined CAZAC training sequence directly from a training sequence provider of a transmitter apparatus.

13. An optical channel sounder, comprising:
- an optical channel sounding transmitter apparatus, comprising:
  - an optical signal generator for generating a first optical carrier signal, wherein the optical signal generator is configured to generate the first optical carrier signal at different carrier frequencies at different time instants according to a predetermined time-frequency grid,
  - an optical modulator for modulating the first optical carrier signal with a predetermined constant-amplitude zero auto-correlation (CAZAC) training sequence to obtain a first modulated optical signal,
  - a first optical transmitter for transmitting the first optical carrier signal, and
  - a second optical transmitter for transmitting the first modulated optical signal; and
- a coherent optical channel sounding receiver apparatus, comprising:
  - a first optical receiver for receiving a second optical carrier signal over a first optical channel,
  - a second optical receiver for receiving a second modulated optical signal over a second optical channel, the second modulated optical signal comprising a received copy of the second optical carrier signal modulated with a predetermined training sequence, the received copy of the second optical carrier signal being affected by the optical channel,
  - an optical down converter for down converting the second modulated optical signal using the second received optical carrier signal to obtain a down converted signal, and
  - a channel estimator for estimating a channel characteristic of the second optical channel upon the basis of the down converted signal and the predetermined CAZAC training sequence, wherein the channel estimator uses a CAZAC sequence flat spectrum property to measure the channel frequency response of the second optical channel.

14. The optical channel sounder according to claim 13, further comprising:
an optical connector for connecting the first optical transmitter and the first optical receiver.

15. The optical channel sounder according to claim 13, wherein the channel estimator is a digital signal processor that receives the predetermined CAZAC training sequence directly from a training sequence provider of the optical channel sounding transmitter apparatus.

* * * * *